(12) United States Patent
Centonza et al.

(10) Patent No.: US 8,755,320 B2
(45) Date of Patent: Jun. 17, 2014

(54) IDENTIFICATION OF MBMS SERVICE FROM A CENTRAL NODE TO UMTS LTE ENBS

(75) Inventors: Angelo Centonza, Winchester (DE); David Randall, Romsey (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1108 days.

(21) Appl. No.: 12/450,300

(22) PCT Filed: Mar. 14, 2008

(86) PCT No.: PCT/EP2008/053125
§ 371 (c)(1),
(2), (4) Date: Mar. 22, 2010

(87) PCT Pub. No.: WO2008/113769
PCT Pub. Date: Sep. 25, 2008

(65) Prior Publication Data
US 2010/0182943 A1    Jul. 22, 2010

(30) Foreign Application Priority Data
Mar. 21, 2007    (GB) .................................. 0705337.4

(51) Int. Cl.
*H04H 20/71*    (2008.01)
(52) U.S. Cl.
USPC ............................. 370/312; 370/432; 370/493

(58) Field of Classification Search
USPC ......... 370/312, 390, 391, 392, 319, 320, 321; 455/450–452.1
See application file for complete search history.

(56) References Cited

U.S. PATENT DOCUMENTS

| | | | |
|---|---|---|---|
| 2004/0017809 A1 * | 1/2004 | Park | 370/390 |
| 2004/0156330 A1 * | 8/2004 | Yi et al. | 370/328 |
| 2005/0170842 A1 | 8/2005 | Chen | |
| 2005/0237960 A1 | 10/2005 | Kim | |

FOREIGN PATENT DOCUMENTS

| | | |
|---|---|---|
| CN | 1534911 | 10/2004 |
| CN | 1914934 | 2/2007 |
| WO | 04/002021 A | 12/2003 |

OTHER PUBLICATIONS

Chinese Office Action for related Chinese Patent Application No. 200880016564.7, issued on Apr. 5, 2012.

* cited by examiner

*Primary Examiner* — Dady Chery
(74) *Attorney, Agent, or Firm* — Staas & Halsey LLP

(57) ABSTRACT

An apparatus configured to receive packets associated with a service and to communicate the packets to at least one user in a system enabling communication of multiple data streams in a transmission is disclosed. The apparatus is configured to assign packets of a data stream with a service identifier.

28 Claims, 3 Drawing Sheets

IDENTIFICATION OF MBMS SERVICE FROM A CENTRAL NODE TO UMTS LTE ENBS

CROSS REFERENCE TO RELATED APPLICATIONS

This application is based on and hereby claims priority to PCT Application No. PCT/EP2008/053125 filed on Mar. 14, 2008 and GB Application No. 0705337.4 filed on Mar. 21, 2007 the contents of which are hereby incorporated by reference.

BACKGROUND OF THE INVENTION

This invention relates to identification of a service provided from a central node in a system wherein multiple data streams are enabled and where the service delivery includes at least one intermediate node.

A communication system is a facility which facilitates communication between two or more entities such as communication devices, network entities and other nodes. A communication system may be provided by one more interconnect networks. One or more gateway nodes may be provided for interconnecting various networks of the system. For example, a gateway node may be provided between an access network and other communication networks, for example a core network and/or a data network. The communication may comprise, for example, communication of data for carrying communications such as voice, electronic mail (email), text message, multimedia and so on.

A user may communicate via a communication system and access various applications by an appropriate communication device. An appropriate access system allows the communication device to access to the communication system. An access to the communications system may be provided by a fixed line or wireless communication interface, or a combination of these. Examples of wireless access systems providing mobility for the users thereof include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers can influence the operation of the lower level functions. In cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network.

A mobile communication system provides mobility for the users thereof. An example of the third generation (3G) mobile communications systems is the universal mobile telecommunications system (UMTS). A non-limiting example of a possible type of access architecture is a concept known as long term evolution (LTE). A particular example of such systems is the Evolved Universal Terrestrial Radio Access (E-UTRA). An Evolved Universal Terrestrial Radio Access Network (E-UTRAN) includes of E-UTRAN Node Bs (eNBs) which are configured to provide base station and control functionalities. Thus in the UMTS service delivery may include intermediate nodes such as at least one long term evolution (LTE) evolved Node B (eNB).

A service provided for mobile users is multimedia broadcast multicast service (MBMS). The MBMS can be described as a multimedia service that is arranged to transmit MBMS data to users by point-to-point (P-t-P) and/or point-to-multipoint (P-t-M) connections. The multimedia broadcasting multicasting services can be divided in two modes, that is into a broadcast mode and multicast mode. For the operation of the multimedia broadcast multicast service (MBMS) in a system based on the UMTS LTE a technique known as single frequency network (SFN) operation has been proposed. This requires the transmission of identical information, at a transport block level, in each cell of a cell group. Furthermore, the physical layer transmissions in each cell of the group must be synchronised very accurately at both the symbol and frame levels. The technique can be important because a user equipment (UE) receiving MBMS transmissions by SFN methods may obtain significant signal to interference advantages when compared to transmissions made independently in each cell.

To enable SFN operation internet protocol (IP) packets containing the MBMS data to be transmitted is mapped to physical layer transport blocks in an identical manner in each of the eNBs that belong to the SFN group of cells. For radio efficiency this should include the segmentation and concatenation of the IP packets. There are a plurality of ways in which this can be done. One method that has been proposed is for the segmentation and concatenation to take place within the eNB. In order that each eNB maps the same IP packets into the same transport blocks a central node, e.g. an MBMS access gateway, timestamps each IP packet or group of packets. It also needs to attach to each packet the accumulated bytes summed over all previous packets since the first packet to receive a particular timestamp i.e. accumulated bytes since the timestamp changed. The eNBs map the IP packets into the first available resource after the timestamp and continue mapping into successive available resources via segmentation and concatenation until there are no IP packets remaining in the input buffer or a new timestamp is received. The accumulated bytes allow the eNB to re-order the IP packets should they be received out of sequence and detect that they have failed to receive particular packets.

SUMMARY

The embodiments described here relates to the case where the segmentation and concatenation take place within a node such as the eNB, in a manner similar to that described above. The embodiments address the case where more than one service, for example a MBMS service, is multiplexed together into a common set of physical resources. A problematic scenario may occur, for example, if variable rate services are collectively mapped to a constant rate physical resource.

High data rate services such as audio/video services delivered in MBMS are natively variable in bit rate. Hence, mapping e.g. a video service with a certain average bit rate to a static set of transport blocks may decrease the efficiency of the air interface as the transport blocks will be partially empty at times and subject to overflow some other times. Multiplexing more than one service together, before segmentation and concatenation, to fit data into the transport blocks can be used to achieve a data stream with a less variant bit rate, therefore increasing air interface efficiency.

The herein described embodiments aim to address one or several of the above problems.

According to an embodiment, there is provided an apparatus configured to receive packets associated with a service and to communicate the packets to at least one user in a system enabling communication of multiple data streams in a transmission, the apparatus being configured to assign packets of a data stream with a service identifier.

In accordance with another embodiment there is provided a communication device configured to receive packets associated with at least one service in a transmission comprising multiple data streams, and to associate the packets with the respective at least one service based on a respective service identifier.

In accordance with another embodiment there is provided a method for communicating data packets associated with at least one service to at least one user in a system enabling communication of multiple data streams in a transmission, the method comprising receiving in a node data packets associated with a service from a data source, assigning the received data packets with a service identifier, and communicating the data packets with the service identifier from the node.

In accordance with yet another embodiment there is provided a method for using data associated with at lest one service, comprising receiving a transmission comprising multiple data streams in a communication device, the transmission comprising packets associated with at least one service, and associating the packets associated with at least one service with the respective at least one service based on a respective service identifier included in the transmission.

In accordance with a more specific embodiment the service identifier may be based on information regarding at least one of the nodes associated with communication of the packets to the at least one user. The service identifier may be based on the identity of at least one of a central node configured to communication the data stream to a access system, a controller of an access system, and a user equipment. The service identifier may comprise a temporary mobile group identity.

The service identifier may be communicated in a packet including also at least one of a timestamp and accumulated byte information.

The service identifier may be assigned by and/or communicated from a node for controlling communication of broadcasting and/or multicasting service and/or a controller for a wireless access system. The node may comprise a multimedia broadcast multicast services entity. The controller may be provided in an Evolved Universal Terrestrial Radio Access Network (E-UTRAN) Node B (eNB).

The service identifier information may be communicated in an IP packet. A packet may be labelled accordingly before transmission thereof on an air interface. The service identifier may be included with a start indication for each packet within a segmented and concatenated transport block.

The service identifier may be communicated with at least one of a timestamp and accumulated byte information.

The methods may be implemented by a computer program comprising program code. The software code may be run in a processor, for example a processor of a station or another node of a communication system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
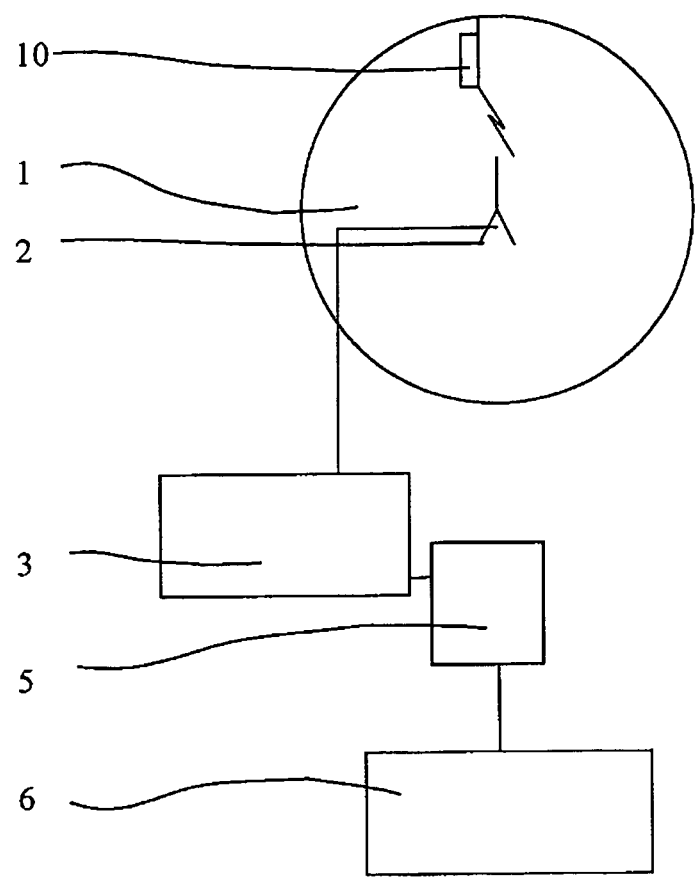
FIG. 1 shows a schematic presentation of a communication system wherein the proposed methods and devices may be embodied.

Reference will now be made in detail to the preferred embodiments of the present invention, examples of which are illustrated in the accompanying drawings, wherein like reference numerals refer to like elements throughout.

Reference is first made to FIG. 1 which shows a communication system wherein the proposed methods and devices may be embodied. The communication system is shown to comprise a radio access system 1. The radio access system 1 is serving a mobile user equipment 10, as will be explained in more detail below. The access system may comprise at least one base station 2 and is controlled by an access network controller 3. The controller 3 may be provided by any appropriate controller. A controller may be provided for each base station or a controller can control a plurality of base stations. Solutions wherein controllers are provided in individual base stations and in the radio access network level for controlling a plurality of base stations are also known. It shall thus be appreciated that the name, location and number of the radio access network controllers depends on the system.

The base station 2 is arranged to transmit signals to and receive signals from the mobile device 10 via a wireless interface. The mobile user may use any appropriate mobile device adapted for Internet Protocol (IP) communication to access the network. For example, a mobile user may access the network by a Personal computer (PC), a Personal Data Assistant (PDA), a mobile station (MS) and so on. The skilled person is familiar with the features and operation of a typical mobile user equipment. Thus these do not need any detailed explanation. It is sufficient to note that the user may use a mobile user equipment 10 for tasks such as for making and receiving phone calls, for receiving and sending data from and to the network and for experiencing e.g., multimedia content. A mobile user equipment may comprise an antenna element for wirelessly receiving and transmitting signals from and to base stations of the mobile communication network. It may also be provided with a display for displaying images and other graphical information for the user of the mobile user equipment. A speaker is also typically provided. The operation of the mobile user equipment may be controlled by an appropriate user interface such as control buttons, voice commands and so on. Furthermore, a mobile user equipment typically provided with a processor entity and a memory.

The wireless access enables mobility of the users thereof. In other words, the mobile user equipment 10 is able to move from one radio coverage area to another coverage area. The location of the mobile user equipment 10 may thus vary in time as the mobile equipment is can move from one location (base station coverage area) to another location and also within a radio coverage area.

The communication network may comprise various switching elements and gateways for enabling communication via a plurality of radio access networks and also for interfacing the one cellular system with other communication system such as with other cellular systems and/or fixed line communication systems. The core network elements may comprise elements such as mobile switching centers (MSC) and/or Packet Data Support Nodes (PDSN), and gateways. These are not relevant to this discussion, and are therefore omitted from the Figures, and will not be explained in any greater detail.

A broadcasting control entity 6 arranged for provision of control the MBMS service is also shown. The mobile user equipment 10 is shown to be located within the area of the at least one base station and thus within the MBMS service area provided by the broadcasting controller entity 6. The broadcasting controller entity can be provided by any appropriate entity configured for controlling broadcasting and/or multicasting in a mobile communication system. An example of possible control entities is the Broadcast Multicast Service Center (BM-SC) in accordance with the 3GPP (Third Generation Partnership Project) specifications.

It shall be appreciated that the FIG. 1 presentation is highly schematic and that in practical implementations the number of base stations or similar transceiver nodes can be substantially higher. One access area may include more than one base station site. A base station apparatus or site may also provide more than one access area. These features depend on the implementation and circumstances.

Figure 3:
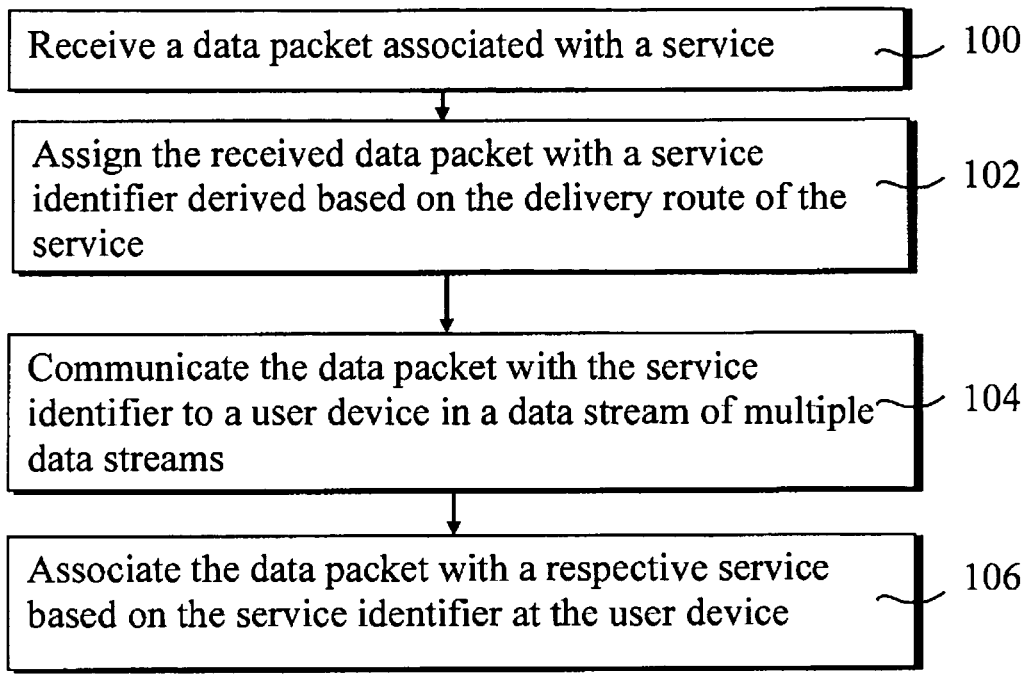
FIGS. 3 and 4 show flowcharts in accordance with certain embodiments.

FIG. 3 shows a general flowchart for a method for communicating data packets associated with at least one service to at least one user in a system enabling communication of multiple data streams in a transmission. In the method comprising a node can receive at 100 data packets associated with a service from a data source. For example, the data packet can originate from a BM-SC and be received at a central node (node 5 in FIG. 1) or an access system controller node (node 3 in FIG. 1). The node receiving the data packets may then assign the packets with a service identifier at 102. The data packets are then communicated at 104 with the service identifier from the node towards the user device. Upon receipt of the packet the user device can at 106 associate the packet with the right service.

Figure 2:
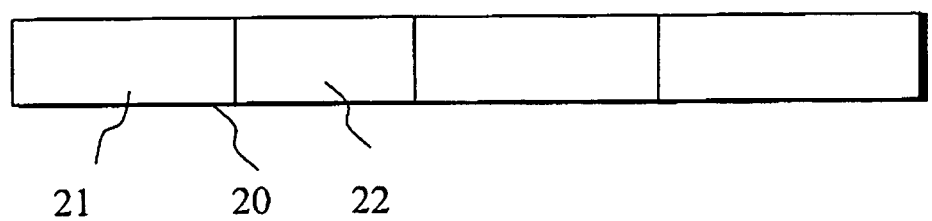
FIG. 2 shows an example of a data packet.
Figure 4:
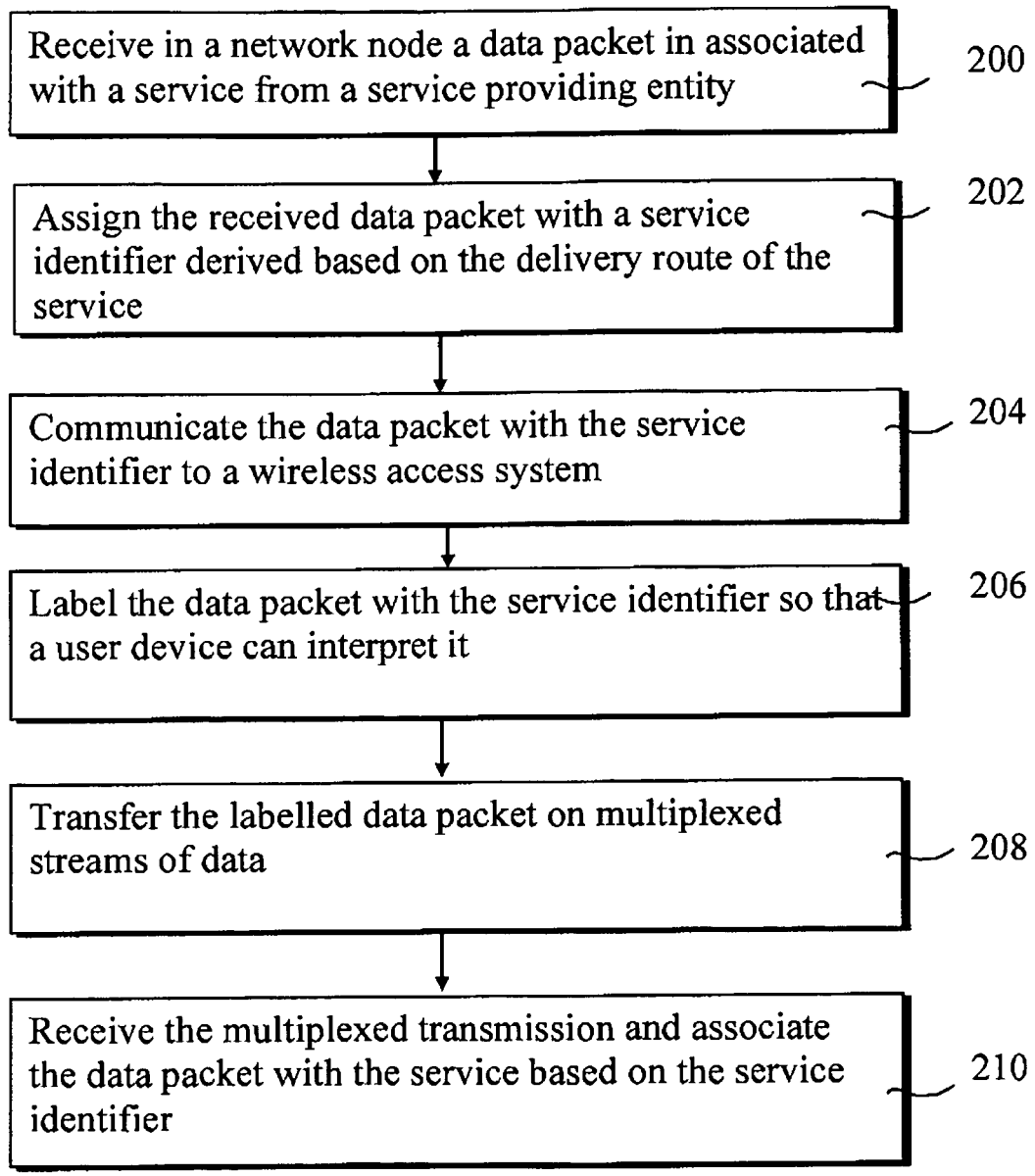

The following describes, with reference to FIGS. 1, 2 and 4, in more detail embodiments wherein an indication of service identity is communicated from a Multimedia Broadcast Multicast Services (MBMS) entity 6 to the access network. More particularly, the following describes a detailed example of providing an extension to the scheme described above with reference to multimedia broadcast multicast services (MBMS) provided in a 3G UMTS system where the access system 1 is provided by an Evolved Universal Terrestrial Radio Access Network (E-UTRAN) that includes of at least one E-UTRAN Node B (eNB).

In a case where two or more MBMS services are mapped to a common set of as single frequency network (SFN) resources, packets that are delivered to eNBs that form the SFN group are transported as a single stream from the respective at least one eNB. This can be provided, for example, by using a common IP (Internet Protocol) address.

The broadcast/multicast service centre (BM-SC) can again be mentioned as an example of a data source for a broadcasting service. Data packets are delivered from the data source to a central communications node 5 for transportation to at least one user (see step 200 in FIG. 4). An MBMS service identity can be included at step 202 of FIG. 4 within the header information that the central node attaches to each MBMS IP packet that the central node has received at 200 from the data source prior communication thereof at 204 to the at least one user. Such a data packet is illustrated in FIG. 2, wherein the identity information is included in the header 21 of an IP packet 20.

The identity may be the services temporary mobile group identity (TMGI) or it might be some alternative identifier that is local to the central node 4 and/or eNB 2 and/or user equipment (UE) 10. For example, a short identifier may be used that is associated with the TMGI at some point in the service establishment signaling.

This per-packet service identifier can be sent together with the timestamp and accumulated byte information. These are shown as being located in 22 of the IP packet 20 of FIG. 2.

The eNB uses the service identity information received with each IP packet received from the central node 5 to label each packet that it transmits on the air interface at 206. For example, the eNB 2 can include the service identity with the start indication for each IP packet within the segmented and concatenated transport block. This may be done e.g. via medium access control (MAC) information elements. The packets are then transmitted at 208 from the access system.

By this the user equipment 10 receiving the physical resources assigned to the MBMS services can identify at 210 which packets relate to the MBMS services that it is interested in. This is because each service data unit (SDU) contained in the MAC frame will be labeled with the TMGI or another appropriate service indicator of the service the packet belongs to.

An MBMS service identity can be sent with each packet transferred between the central node 5 and the eNB 2. The eNB may then incorporate these into the medium access control (MAC) headers of the transport blocks that it forms in order to transmit the MBMS services.

Other possibilities for communicating the service identity are also possible. For example, it is possible to provide groups of packets so that only a few, or one of the packets of the group includes the service identity. For example, the first and last packet of a group can be flagged and provided with the service identity. The identity may provide the flagging. The recipient node can then determine, based on knowledge of the group, the service identity associated with each of the packets.

The required data processing functions and/or protocol entities may be provided by one or more data processors. Data processing may be provided in a processing unit provided in a controller of an access system and the another controller in a central node. Data processing may also be distributed across several data processing modules in the communication system. The above described functions may be provided by separate processors or by an integrated processor. An appropriately adapted computer program code product or products may be used for implementing the embodiments, when loaded on an appropriate processor, for example in a processor of an access system controller or a user device. The program code may, for example, perform the generation and/or interpretation of identity information signaled between the various entities and control triggering of various operations. The program code product for providing the operation may be stored on and provided by a carrier medium such as a carrier disc, card or tape. A possibility is to download the program code product to the mobile device via a data network.

It is noted that whilst embodiments have been described in relation to user equipment such as mobile terminal devices, the embodiments are applicable to any other suitable type of apparatus suitable for communication via an access system. It is also noted that although certain embodiments were described above by way of example with reference to certain exemplifying architectures for wireless networks, technologies and standards, embodiments may be applied to any other suitable forms of communication systems than those illustrated and described herein. It is also noted that the term access system is understood to refer to any access system configured for enabling wireless communication for user accessing applications.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method comprising:
   receiving a plurality of packet data streams respectively associated with a plurality of multimedia broadcast multicast services (MBMS), each packet being associated with a timestamp;
   mapping the packets to transport blocks such that packets associated with the same timestamp are mapped to the same transport block, and such that packets associated with different multimedia broadcast multicast services (MBMS) are mapped to the same transport block, each transport block having a header;
   adding a service identifier to the header of only a first packet and a last packet of each transport block, the service identifier identifying the multimedia broadcast multicast service MBMS associated with each packet mapped to the transport block; and
   transmitting the transport blocks to a plurality of wireless users via a wireless interface, the transport blocks being transmitted after the packets have been mapped to the transport blocks and after the service identifier has been added to the header of each transport block.

2. An apparatus comprising:
   a receiver to receive a data stream of packets associated with a service;
   an assignment unit to assign a service identifier to only a first packet and a last packet of the data stream, each service identifier identifying a multimedia broadcast multicast service (MBMS) associated with the respective packet; and
   a transmitter to communicate the packets to a user in a system enabling communication of multiple data streams in a transmission.

3. The apparatus as claimed in claim 2, wherein the service identifier is based on information regarding a node associated with communication of the packets to the user.

4. The n apparatus as claimed in claim 2, wherein the service identifier is based on an identity of at least one of a central node configured to communicate the data stream to an access system, a controller of the access system, and a user equipment.

5. The apparatus as claimed in claim 2, wherein the service identifier comprises a temporary mobile group identity.

6. The apparatus as claimed in claim 2, wherein the service identifier is communicated in a packet also including at least one of a timestamp and accumulated byte information.

7. The apparatus as claimed in claim 2, wherein the receiver, the assignment unit and the transmitter are provided in a node that controls communication of broadcasting and/or multicasting the service.

8. The apparatus as claimed in claim 7, wherein the node comprises a multimedia broadcast multicast services entity.

9. The apparatus as claimed in claim 2, wherein the receiver, the assignment unit and the transmitter are provided in a controller for a wireless access system.

10. The apparatus as claimed in claim 9, wherein the controller is provided in an Evolved Universal Terrestrial Radio Access Network (E-UTRAN) Node B.

11. The apparatus as claimed in claim 9, wherein the assignment unit processes service identifier information received in an IP packet and labels the packet accordingly before transmission on an air interface.

12. The apparatus as claimed in claim 11, wherein
   the packets are mapped to and transmitted within a segmented and concatenated transport block, and
   the assignment unit includes the service identifier with a start indication for each packet within the transport block.

13. A communication device comprising:
   a receiver to receive packets associated with at least one service in a transmission comprising multiple data streams; and
   an association device to associate the packets with the respective at least one service based on a respective service identifier, each service identifier identifying a multimedia broadcast multicast service (MBMS) associated with the respective packet, each service identifier being included in only a first packet and a last packet of the respective data stream.

14. The communication device as claimed in claim 13, wherein the service identifier is based on information regarding a node associated with communication of the packets from a data source to the communication device.

15. The communication device as claimed in claim 13, wherein
   the packets are received in a segmented and concatenated transport block,
   the service identifier includes a start indication for each packet, and
   the service identifier is interpreted from the start indication.

16. A method for communicating data packets associated with at least one service to at least one user in a system enabling communication of multiple data streams in a transmission, the method comprising:
   receiving in a node data packets associated with a service from a data source;
   assigning the received data packets with a service identifier, each service identifier identifying a multimedia broadcast multicast service (MBMS) associated with the respective packet, each service identifier being included in only a first packet and a last packet of the respective data stream; and
   communicating the data packets with the service identifier from the node.

17. The method as claimed in claim 16, further comprising generating the service identifier based on information regarding a node associated with communication of the packets to the at least one user.

18. The method as claimed in claim 16, wherein the service identifier is based on an identity of at least one of a central node configured to communicate the data stream to an access system, a controller of the access system, and a user equipment.

19. The method as claimed in claim 16, wherein the service identifier comprises a temporary mobile group identity.

20. The method as claimed in claim 16, further comprising communicating the service identifier with at least one of a timestamp and accumulated byte information.

21. The method as claimed in claim 16, wherein the step of assigning is provided in one of a node for controlling communication of broadcasting and/or multicasting the service and a controller for a wireless access system.

22. The method as claimed in claim 16, further comprising:
receiving service identifier information in an IP packet;
labeling the packet with the service identifier information before transmission of the packet; and
multiplexing the packet into a transmission on an air interface.

23. The method as claimed in claim 21, wherein
the packets are mapped to and transmitted within a segmented and concatenated transport block, and
the service identifier is included with a start indication for each packet within the transport block.

24. A non-transitory computer readable storage medium containing a program to control a computer to perform the method of claim 22.

25. A method for using data associated with at least one service, comprising:
receiving a transmission comprising multiple data streams in a communication device, the transmission comprising packets associated with at least one service; and
associating the packets with the respective at least one service based on a respective service identifier included in the transmission, each service identifier identifying a multimedia broadcast multicast service (MBMS) associated with the respective packet, each service identifier being included in only a first packet and a last packet of the respective data stream.

26. The method as claimed in claim 25, wherein the service identifier is based on information regarding a node associated with communication of the packets from a data source to the communication device.

27. The method as claimed in claim 26, further comprising:
receiving the packets in a segmented and concatenated transport block; and
obtaining a start indication for each packet from the service identifier.

28. A non-transitory computer readable storage medium containing a program to control a computer to perform the method of claim 26.

* * * * *